Figure 1:
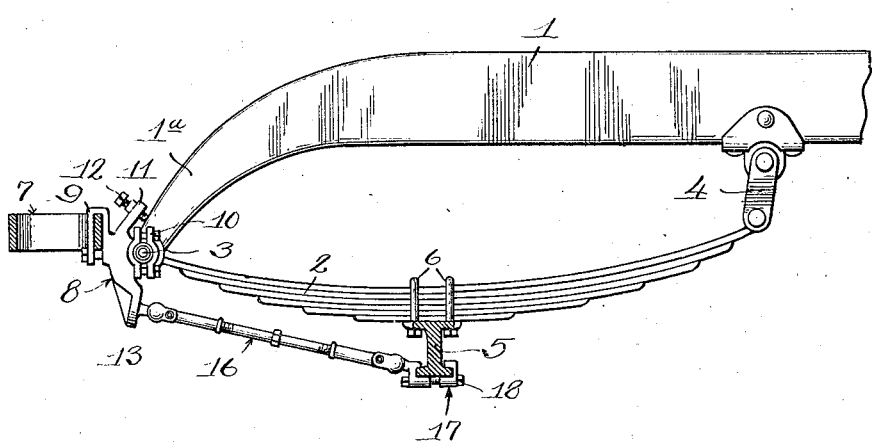

Nov. 27, 1923.

W. R. McGOWEN 1,475,348

BUMPER SUPPORTING BRACKET

Filed Feb. 17, 1923

Inventor,
William R. McGowen,
By Freed Poole Hunton+Scott. Attys.

Patented Nov. 27, 1923.

1,475,348

UNITED STATES PATENT OFFICE.

WILLIAM R. McGOWEN, OF CHICAGO, ILLINOIS, ASSIGNOR TO AMERICAN BUMPER COMPANY, OF CHICAGO, ILLINOIS, A CORPORATION OF ILLINOIS.

BUMPER-SUPPORTING BRACKET.

Application filed February 17, 1923. Serial No. 619,564.

*To all whom it may concern:*

Be it known that I, WILLIAM R. Mc-GOWEN, a citizen of the United States, and a resident of Chicago, in the county of Cook and State of Illinois, have invented certain new and useful Improvements in Bumper-Supporting Brackets, of which the following is a specification.

This invention relates to improvements in bumper supporting brackets, and more particularly to devices of the character described in a prior patent granted to me on the 13th day of June, 1922, and bearing No. 1,419,279.

The object of the present invention is to provide an improved construction for supporting brackets for vehicle bumpers. The increasing popularity of bumpers as protective devices has brought about the use of more massive structures with the attendant increased weight carried or suspended forwardly of the points of support. As a natural consequence, stronger and more elaborate attaching devices have been required in order to withstand the excessive vibration of the bumper occasioned by the movement of the vehicle at high speeds or over rough pavement.

As pointed out in said prior patent, the requirement for additional support has been obtained by the use of a thrust rod extending from the front axle of the vehicle to a depending arm formed integral with the bumper supporting bracket, which bracket is mounted upon the spring bolt at the forward end of the vehicle frame, and while this general scheme has been herein disclosed, it is the purpose of the present disclosure to provide an improved form of thrust rod calculated to perform the same function as heretofore, but of a design better suited to afford greater resistance to wear, greater ease of adjustment, and capable of withstanding vibration without deterioration and the necessity of frequent attention.

In the drawings—

Figure 2:
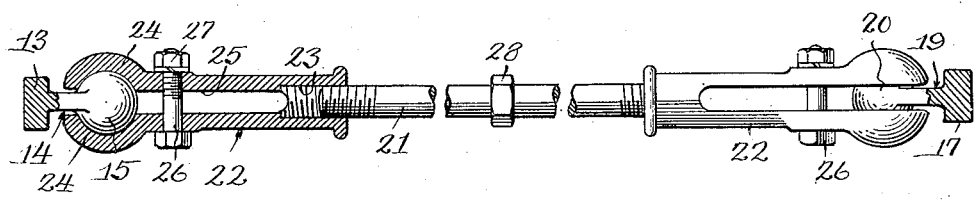

Figure 1 is a view in side elevation of a bumper installation, showing the complete bumper supporting bracket, and Figure 2 is a detailed view of the thrust rod with a portion in section to show the detailed construction.

Figure 1 illustrates the forward end portion of a single frame member 1 of the typical automobile chassis, and terminating at its forward end in the usual downwardly curved end portion 1ª. Immediately below the frame member is a spring 2 connected at one end to the end of the frame member by means of a pivot bolt 3, and at its rear end to the underside of the frame member by means of a shackle 4. The central portion of the spring 2 rests upon and is anchored to the front axle 5 of the vehicle by means of U-bolts 6, said axle being of the usual I-beam section.

As already suggested, the bumper 7 is supported forwardly of the end of the frame member 1 by means of a bracket 8, consisting primarily of an inverted U-shaped clamping member 9 engaging the rearwardly disposed portion of the bumper, and a two-part clamping collar 10 which surrounds a nut carried by the spring bolt 3. The bracket 8 also includes an upwardly and rearwardly inclined arm 11, carrying a set screw 12 bearing endwise against the forward inclined face of the frame member 1, and a downwardly extending arm 13 having a rearwardly projecting finger 14 terminating in a spherical or ball-end 15.

Extending from the end of the arm 13 of the bracket 8 to the front axle 5 is a thrust rod 16, this being the portion of the bracket to which the present invention pertains. As clearly shown in Figure 1, the thrust rod 16 extends rearwardly with a slight downward inclination to the lower portion of the front axle 5, and is attached thereto by means of a two-part clip 17 which straddles the under side of the axle and is clamped in place by means of a bolt 18. Formed integral with the front half of the clip 17 is a finger 19, likewise provided with a spherical end 20, said finger extending in a forward direction and in alinement with the axis of the thrust rod 16.

Referring to the construction of the thrust rod 16, the same consists of a solid rod 21 carrying at its ends two socket fittings 22, 22. These socket fittings are bifurcated substantially throughout their length, and are provided at their inner ends with threaded sockets 23, into which the threaded ends of the rod 21 are inserted. At the outer ends of the fittings are formed hemi-spherical jaws 24, 24, spaced apart longitudinally by the wide bifurcating slot 25 extending to the base of the threaded socket 23. Immediately inward beyond each hemi-spherical end of the socket fitting is a tension bolt 26, extending transversely through the bifurcated portion thereof and preferably having screw threaded engagement with one of said portions with its projecting threaded end surmounted by a nut 27 which serves to lock the bolt against rotation.

As clearly shown in Figure 2, the hemispherical end portions 24, 24 of the fittings 22, 22 embrace the ball-tipped ends of the fingers 14 and 19, thus forming a ball and socket joint (or what is often termed a "doll's head" joint) at either end of the thrust rod.

In applying the thrust rod the bifurcating slots 25, 25 are positioned in a vertical plane, as shown in Figure 1, thereby permitting a rotative or swivel action at the ends of the thrust rod and in a vertical plane, this action being the normal result of the spring action between the frame member 1 and the front axle 5. The connection between the ends of the thrust rod and the ball-tipped ends of the bumper bracket 8 and axle clip 17, is readily made by loosening or removing the bolts 26, 26 and spreading the free ends of the socket fittings over the ball tips. Furthermore, the tension or frictional contact between ball and socket is adjusted by the bolts 26, 26.

Bearing in mind that the thrust rod 16 resists endwise thrust in both directions, due to the vibration of the bumper in a vertical plane, and at the same time a swivel action occurs at the doll's-head joints, due to the spring action of the vehicle, it is manifest that these joints are subjected to considerable wear, which would not be withstood by an ordinary connection (such as a pin and slot) without rapid wear and the necessity of frequent replacement, as well as adjustment of parts, to compensate for the looseness and lost motion which would develop. By utilizing the construction herein disclosed, including a variation of the so-called doll's-head joint, the wear is not only distributed uniformly throughout the spherical surfaces in contact, but any looseness that may develop by reason of such wear is readily taken up by means of the tension bolts 26, 26. It follows, therefore, that the life of the bracket is materially increased by the construction herein set forth.

As an additional feature, the intermediate rod 21 is preferably provided at its ends with threads of opposite leads, that is, one end has a right-hand thread, and the other has a left-hand thread. Similarly, the sockets at the ends of the fittings 22, 22 are threaded or tapped to correspond. At the central portion of the rod 21 is formed an integral hexagonal nut 28, to which a wrench may be applied. By this arrangement it is possible to adjust the thrust rod for length by turning the same in one direction or the other and without disconnecting the ends of the rod from the parts to which they are attached. This feature, coupled with the arrangement of joints, therefore provides an exceedingly practical improvement in bumper supporting brackets in which a thrust rod is utilized for affording additional rigidity in the bracket construction.

Having described a preferred embodiment of the invention and the advantages thereof, I claim—

1. A bumper supporting bracket adapted to be mounted at the end of a vehicle frame and comprising a thrust rod connecting said bracket with the vehicle axle, said rod having swivel connection at its ends through the medium of ball and socket joints.

2. A bumper supporting bracket adapted to be attached to the end of a vehicle frame member and comprising an arm extending radially from the point of attachment, and a rod extending from the vehicle axle to the end of said arm and connected therewith through the medium of ball and socket joints.

3. A bumper supporting bracket adapted to be attached to the end of a vehicle frame and comprising an arm extending radially from the point of attachment, and a rod extending from the vehicle axle to the end of said arm, the ends of said rod being provided with substantially spherical sockets adapted to engage ball-tipped members mounted upon the end of said arm and on said axle.

4. A bumper supporting bracket adapted to be attached to the end of a vehicle frame member and comprising an arm extending radially from the point of attachment, and an extensible rod extending from the end of said arm to the vehicle axle, and comprising bifurcated fittings having substantially spherical sockets formed at the ends thereof and adapted to engage ball-tipped members mounted on said bracket and the front axle of the vehicle.

5. A bumper supporting bracket adapted to be mounted at the end of a vehicle frame and comprising a thrust rod connecting said bracket with the vehicle axle, ball-tipped members connected with said bracket and axle, said rod having socket fittings at its ends and having yieldable sockets engaging said ball-tipped members.

6. A bumper supporting bracket adapted to be attached to the end of a vehicle frame member and comprising an arm extending radially from the point of attachment, a thrust rod adapted to extend from the vehicle axle to the end of said arm, ball and socket joint members formed at the ends of said rod and on said bracket arm and axle, and means for adjusting the tension at said joints.

7. A bumper supporting bracket adapted to be attached to the end of a vehicle frame member and comprising an arm extending radially from the point of attachment, and a thrust rod extending from the vehicle axle to the end of said arm, the ends of said rod being provided with socket fittings having bifurcated sockets at their ends and adapted to engage ball-tipped members mounted upon the end of said arm and on said axle, and tension bolts extending transversely of said fittings adjacent said sockets.

In witness whereof, I hereunto subscribe my name this 13th day of February, A. D., 1923.

WILLIAM R. McGOWEN.